United States Patent [19]
Reed

[11] 3,940,988
[45] Mar. 2, 1976

[54] VELOCITY THERMOCOUPLE
[75] Inventor: Robert D. Reed, Tulsa, Okla.
[73] Assignee: John Zink Company, Tulsa, Okla.
[22] Filed: Mar. 11, 1974
[21] Appl. No.: 449,775

[52] U.S. Cl. ................................ 73/349; 136/231
[51] Int. Cl.² .................................. G01K 13/02
[58] Field of Search.................. 73/349; 136/231

[56] References Cited
UNITED STATES PATENTS

| | | | |
|---|---|---|---|
| 1,791,020 | 2/1931 | Wilson | 136/231 |
| 2,291,448 | 7/1942 | Bragg | 136/231 |
| 2,970,475 | 2/1961 | Werner | 73/349 X |
| 3,623,367 | 11/1971 | Benedict | 73/349 X |

Primary Examiner—Richard C. Queisser
Assistant Examiner—Frederick Shoon
Attorney, Agent, or Firm—Head, Johnson & Chafin

[57] ABSTRACT

An apparatus comprising a thin-walled cylindrical metal conduit inserted into the path of the flowing hot gas with a thermal sensor positioned in the conduit along its axis. There are one or more smaller diameter thin-walled tubes positioned inside of the larger conduit over a portion of its length. The smaller tubes are concentric with each other and with the larger conduit and surround the sensor, so that there can be gas flow through the annular spaces between each of the tubes and between the sensor and the inner tube. Means are provided for causing a flow of hot gas through these annular spaces so as to bring at least the central small tube up to the temperature of the flowing gas and with it the temperature of the sensor.

5 Claims, 6 Drawing Figures

VELOCITY THERMOCOUPLE

BACKGROUND OF THE INVENTION

This invention lies in the field of the temperature measurement of flowing hot gases. Still more particularly, it is concerned with an improved sensor system to provide a more accurate measurement of the temperature of the flowing gases.

In the art of gas temperature measurement by thermocouple, or other sensor, where the thermal sensor is either bare and directly inserted into the gas flow or encased in a thermo well, which is projected into the flow of hot gas, there is danger that the temperature indicated by the sensor will be significantly lower than the true gas temperature because of heat loss from either the thermal sensor or from the thermo well. In general, the heat loss is typically by radiation, and can be of the magnitude of hundreds of degrees fahrenheit.

SUMMARY OF THE INVENTION

It is a primary object of this invention to provide a simple and inexpensive means of protecting a thermal sensor from heat radiation so that it can be inserted into a flowing gas stream to precisely measure the temperature of the gas stream.

This and other objects are realized and the limitations of the prior art are overcome by providing a thin-walled cylindrical conduit which projects through a duct wall into a flowing stream of hot gas. A thermal sensor is inserted axially into and is sealed to the conduit so that the conduit is closed off at its end outside of the duct. One or more shorter lengths of cylindrical thin-walled tubing are mounted coaxially inside of the conduit and surrounding the sensor. Means are provided for causing the hot gases to flow, at least for a portion of its length, axially along the conduit and through the annular spaces between the sensor and the innermost small tube and through the annular spaces between the small tubes and the large conduit.

BRIEF DESCRIPTION OF THE DRAWINGS

These and other objects and advantages of this invention and a better understanding of the principles and details of the invention will be evident from the following description taken in conjunction with the appended drawings in which.

Figure 1:
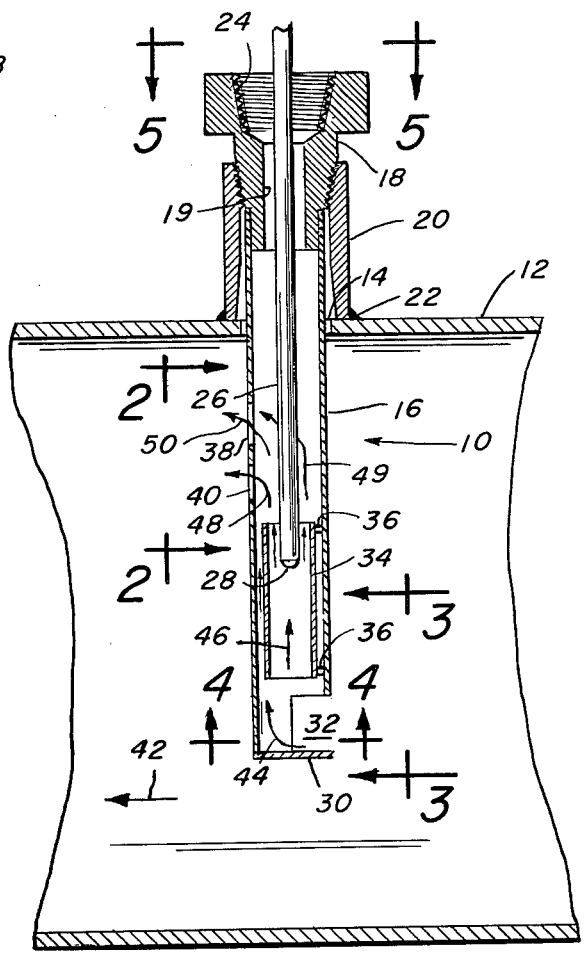
FIG. 1 shows in vertical cross section one embodiment of this invention in which the sensor is perpendicular to the direction of gas flow.

Referring now to the drawings, there is shown in FIG. 1, in cross section, a view of a duct or stack, etc. 12 with a welded threaded connection 20 attached to the wall of the duct 12 with its axis perpendicular to the axis of the duct. This threaded mounting support 20 is attached as by welding 22 or other means to the duct. There is a circular opening 14 in the duct wall along the axis of the mounting 20 through which is inserted a long thin-walled tubular conduit 16 which is attached to a plug 18 which is attached, as by threads, to the mounting means 20, so that the cylindrical conduit 16 extends into the duct 12 and is substantially perpendicular to the direction of gas flow indicated by the arrow 42. A thermal sensor, which can be a thermometer, a thermocouple or a thermistor, is positioned along the axis of the conduit 16 and is held in position by plug means and packing (not shown) fastened by threads 24 to the plug 18. Thus, the outboard end of the conduit 16 is closed off by the plug 18, and the packing and plug which are inserted into the threaded opening 24.

Figure 3:
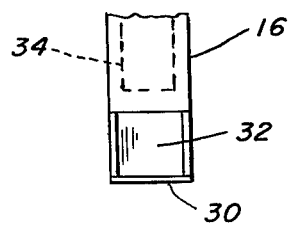
FIG. 3 is a view taken along the plane 3—3 of FIG. 1.

The inboard end of the conduit 16 is closed off by a circular disc 30 and there is an opening 32 cut across the face of the conduit 16, as shown in FIGS. 1 and 3. The conduit 16 is positioned in the duct so that the opening 32 faces directly in the direction from which the hot gases are flowing, that is, in the direction opposite to arrow 42. There are one or more openings 38, 40 in the back side of the conduit 16 at a position approaching the wall of the duct 12, so that due to the kinetic energy of the flowing gases in the direction 42, there will be flow of gases into the opening 32 and axially along the conduit 16, as shown by arrows 44 and 46. These will flow along the axis of the conduit 16, and because of the end closure of the conduit 16, will flow out of the openings 38 and 40 in the direction of arrows 48, 49 and 50. Thus, there will be a continuous flow of hot gases into the conduit 16, through the opening 32 and out of the openings 38 and 40, when there is gas flow in the direction of the arrow 42.

The thermal sensor 26 is positioned so that its area of sensitivity is positioned intermediate the opening 32 and the openings 38, 40 so that there will be a continuous flow of hot gases over the thermal element, when temperature indication is required for flowing gases.

Figure 5:
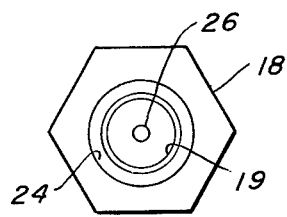
FIG. 5 is a view taken along the plane 5—5 of FIG. 1.
Figure 2:
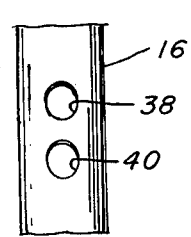
FIG. 2 is a view taken along the plane 2—2 of FIG. 1.
Figure 4:
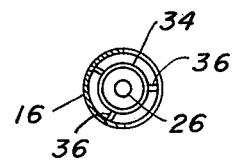
FIG. 4 is a cross section perpendicular to the axis of the sensor of FIG. 1.

There are one or more cylindrical thin-walled tubes 34 of lesser diameter than and inside of the conduit 16. The tube or tubes 34 are held in position by radial spacers 36 or other means. In the preferred arrangement the sensor 16, tubes 34 and conduit 16 are coaxial providing annular spaces through which the hot gases flow in accordance with the arrows indicated. The inner tube 34 is clearly shown in the cross section of FIG. 4. FIG. 5 indicates a view looking down on the plug 18, with the thermal sensor 26 in place inside the opening 19 but without the plug and packing, or other seal which will close the threaded opening 24 to hold the thermal sensor in position, and to prevent passage of hot gases out through the opening 19.

To measure the gas temperature by means of a thermal sensor such as 26 it is necessary to pass the hot gases in intimate contact with the sensing surface 28 of the thermal sensor 26. It is also important to prevent thermal radiation, or other heat loss, from the thermal sensor, itself, which occurs when the surfaces surrounding the sensor are at a lower temperature. This loss by radiation is prevented by placing the thermal sensor inside of the tube or tubes 34 which are bathed in the flow of hot gas over inner and outer surfaces. Conduit 16 may not necessarily be at the temperature of the gases, since it is subject to radiation outward to cooler adjacent areas. Therefore, it is important to have at least one inner tube, such as 34, which is protected from radiation outwardly to the cooler areas by being surrounded by the conduit 16. Although the conduit 16 may not be at the precise temperature of the gas, it is closer to the true temperature of the gas than is an outside wall such as duct 12. Thus, the inner tube 34, being bathed in the flow of hot gases on its inner and outer surface, and protected from radiation by the almost equally high temperature surface of the conduit 16 provides a means of reducing the radiation from the thermal unit 28 which will reach and remain at a temperature closely corresponding to that of the hot gases flowing over its surface. To further minimize the error in temperature of the sensor due to the lesser temperature of adjacent areas additional tubes may be inserted, preferably concentric but not limited thereto, surrounding the tube 34.

It is important in such a device as indicated in FIG. 1 to control the velocity of flow of the gas through the spaced conduits to a value somewhere in the range of from 10 to 50 feet per seond, and preferably, within the range of 10 to 20 feet per second. With too low a flow velocity there is no assurance that the surfaces of the conduits will reach the true temperature of the gas. On the other hand, if the physical velocity of flow is too high, then the effective molecular velocity will be higher than the true molecular velocity corresponding to the thermal temperature of the gas, so that the thermal unit 28 will read a value higher than the true temperature of the gas. It has been determined however that when the velocity of gas flow is ideally about 20 feet per second through the conduit 16, the temperature of the gas flowing in stacks and ducts can be determined with a maximum degree of accuracy.

While the system shown utilizes the kinetic energy of the gas to cause it to flow through the constricted annular spaces, it is part of this invention to provide other means of causing a flow of the hot gases through the annular spaces, such as by using an ejector, pump, or other well known means.

Since the flow velocity is important, such velocity through the conduit 16 will be dependent upon the velocity of gases in the duct 12. It is possible to vary the flow of gas through the conduit 16, either or both by adjusting the diameter of the openings 38 and 40, or by rotating the conduit 16 so that only a portion of the opening 32 is exposed to the flow of gas.

Although a plurality, e.g., two openings 38 and 40 are shown, a single opening or appropriate area can, of course, be used.

Figure 6:
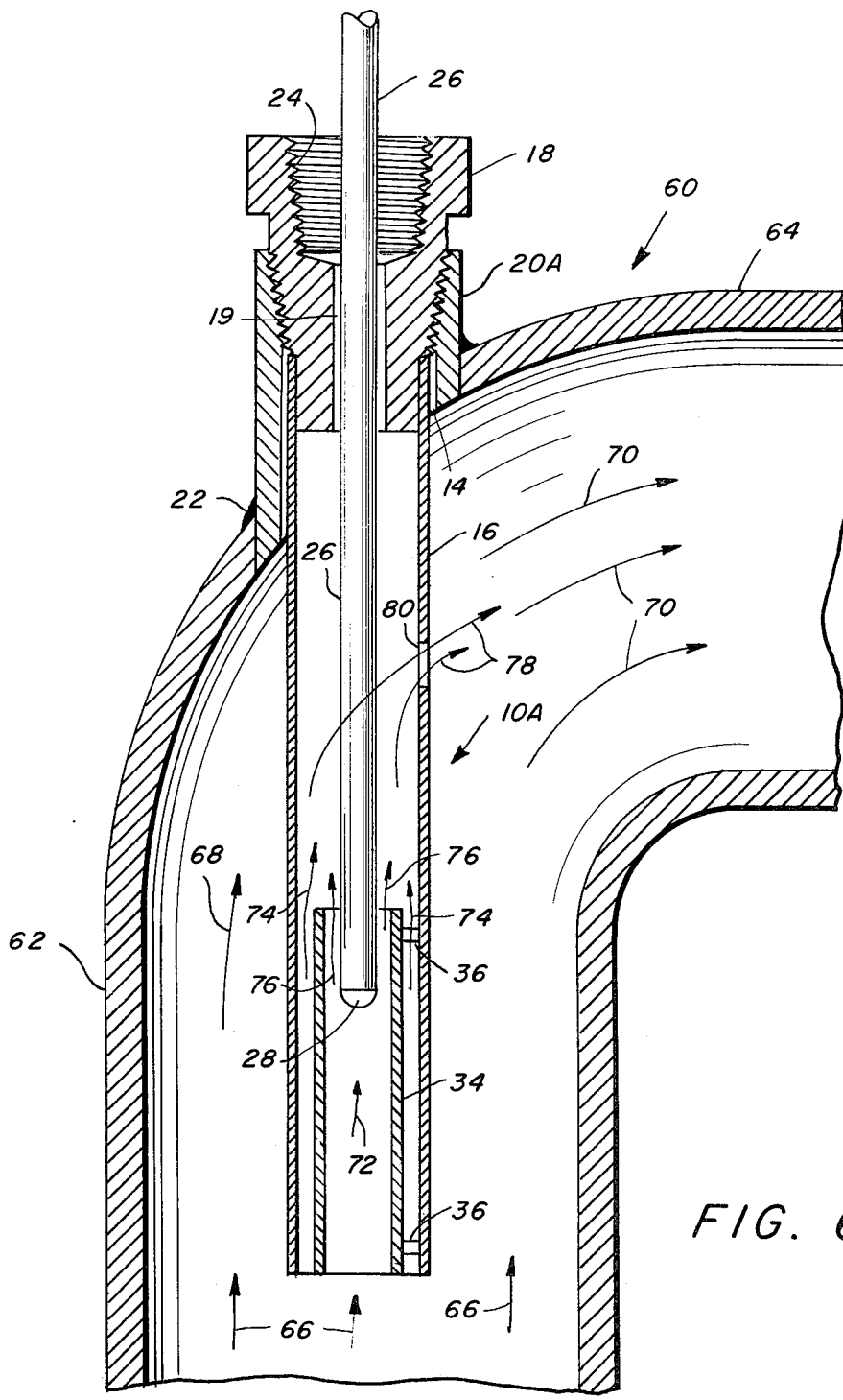
FIG. 6 illustrates an embodiment in which the sensor is parallel to the direction of gas flow.

In FIG. 6 is shown another embodiment of the invention in which the sensor is inserted into the duct or pipe parallel to or generally in the direction of flow of gases. The duct or pipe is shown at 60 with an upstream portion 62 entering a bend 64 for a right angle turn. As in FIG. 1 there is a welded threaded mounting connection 20A at about the center of the bend, with the axis of the mounting preferably along the axis of the leading pipe 62. The threaded mounting support 20A is attached to the pipe 62 by means such as the weld, 22, or other means. There is a circular opening 14 concentric with the mounting 20A through which the sensor assembly 10A can be inserted and supported by the mounting 20A by means of the threaded plug 18. The cylindrical conduit 16 is attached to the plug 18 and is inserted through the opening 14 and extends into the pipe 62 with its open end directed upstream against the gas flow 66.

The gas flow indicated by arrows 66 flowing up the pipe 62 will pass into the inner tube 34 of the assembly 10A which surrounds the sensor surface 28 of the sensor 26. The sensor 26 is held in position in the plug 18 by means of a seal and plug (not shown) held by the threaded portion 24, as is well known in the art. There is an opening, or a plurality of openings 80 in the conduit 16 so that the gases 66 flowing into the conduit in accordance with arrows 72, 74, 76, and 78 will pass through the annular spaces surrounding the sensor and out through the opening 80. Dependent upon the velocity of flow of the gases 66, the size of the opening or openings 80 is chosen to provide an optimum velocity of gas flow past the sensor 28 and tubes 34.

If there is insufficient velocity in the gases 66 to provide an optimum rate of flow through the annular spaces, aspirator means, or other means, can be provided to draw gases through these spaces and past the sensor at a optimum velocity.

While the axis of the conduit 16 is preferably along the axis of the pipe 62, it need not be coaxial, or even precisely parallel to the axis of the pipe or conduit 62. However, there should be enough of the end opening of the conduit 16 exposed to the oncoming flow of gas 66 to generate enough pressure to cause the velocity of flow of gas past the sensor to be in the optimum range.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claims or claim, including the full range of equivalency to which each element or step thereof is entitled.

What is claimed:

1. An improved sensor for measuring the temperature of a flowing stream of hot gas in a closed pipe comprising:
   a. a first thin-walled tubular metal conduit removably secured at one end from the exterior of said pipe and projecting transversly across the path of said gas flow, said first conduit essentially closed at the other end, a not more than 180° lower opening on the upstream side of said first conduit adjacent said other end, an upper opening on the downstream side of said first conduit adjacent said one end whereby a portion of said flowing stream of hot gas is transversly diverted in flow into said lower opening upwardly through said first conduit, thence outward back into said flowing stream through said upper opening;
   b. temperature sensitive means axially positioned inside said conduit between said upper and lower openings and removably secured from the exterior of said pipe; and
   c. at least one thin-walled metal cylindrical open end tube of lesser diameter than said conduit, positioned co-axially in said first conduit between said lower and upper openings and surrounding said temperature sensitive means, with annular spaces for gas flow between said tube and said conduit.

2. The system as in claim 1 including a plurality of tubes coaxially nested within each other, positioned inside said conduit with annular gas flow space between them and surrounding said temperature sensitive means.

3. The system as in claim 1 in which said temperature sensitive means comprises thermistor means.

4. The system as in claim 1 in which said temperature sensitive means comprises thermocouple means.

5. The system as in claim 1 in which said temperature sensitive means comprises thermometer means.

* * * * *